United States Patent [19]

Hulls et al.

[11] 3,977,239
[45] Aug. 31, 1976

[54] ENGINE DIAGNOSIS FROM FREQUENCY COMPONENTS IN EXHAUST

[75] Inventors: Leonard Robin Hulls, Middlesex; Stephen Clow Hadden, Acton, both of Mass.

[73] Assignee: RCA Corporation, New York, N.Y.

[22] Filed: Jan. 2, 1976

[21] Appl. No.: 646,388

[52] U.S. Cl. ............................................. 73/115
[51] Int. Cl.² .................................... G01M 15/00
[58] Field of Search.................. 73/115, 116, 117.3

[56] References Cited
UNITED STATES PATENTS 3,868,625  2/1975  Speigner et al. ..................... 73/115

*Primary Examiner*—James J. Gill
*Assistant Examiner*—Anthony V. Ciarlante
*Attorney, Agent, or Firm*—Edward J. Norton; Carl V. Olson

[57] ABSTRACT

An engine diagnostic apparatus includes a transducer for translating an exhaust pressure waveform emitted by an engine to a corresponding complex electrical signal having a prominent fundamental frequency component which represents the cylinder firing frequency and varies in direct proportion with engine speed, and having a subharmonic frequency component at a frequency which is a submultiple of the fundamental frequency. The subharmonic frequency component and the fundamental frequency component are separated from the complex electrical signal and from each other. A comparator compares the amplitude of the subharmonic frequency component with the amplitude of the fundamental frequency component to provide a measure of the unevenness of power strokes from individual cylinders of the engine.

8 Claims, 4 Drawing Figures

ENGINE DIAGNOSIS FROM FREQUENCY COMPONENTS IN EXHAUST

BACKGROUND OF THE INVENTION

Diagnostic apparatus for internal combustion engines has necessarily included means for making electrical and mechanical connections to an engine to measure engine speed, ignition timing, compression, etc. Now, it has been found possible to measure engine speed without making any electrical or mechanical connections to the engine by means including a transducer for sensing pressure variations at the end of the engine exhaust pipe due to explosions in individual cylinders of the engine. Such an apparatus is described in a patent application Ser. No. 573,032 filed on Apr. 30, 1975, by S. C. Hadden et al. for a "Tachometer Without Physical Connection to Internal Combustion Engine." The described apparatus for measuring engine speed includes means for tracking rapid changes in engine speed and, therefore, it can be used in the performance of an acceleration burst test for determining the torque and horsepower of the engine. The ability of the described apparatus to track rapidly changing engine speed is improved by inclusion of a signal-frequency tracking band-pass filter as described in a patent application, Ser. No. 573,034, filed on Apr. 30, 1975, by E. M. Sutphin, Jr, on a "Filter Which Tracks Changing Frequency of Input Signal." It is desirable to use these background techniques in a system for providing engine diagnostic information which is in addition to the torque and horsepower information provided by the described apparatus.

SUMMARY OF THE INVENTION

An engine exhaust pressure waveform is translated by a transducer to a corresponding complex electrical signal including a prominent fundamental frequency component, and a subharmonic frequency component, both proportional to engine speed. The ratios of the amplitudes of the subharmonic frequency components to the fundamental frequency component at various engine speeds provide measures of malfunctions affecting individual cylinders of the engine.

DESCRIPTION OF THE PREFERRED EMBODIMENT

Figure 1:
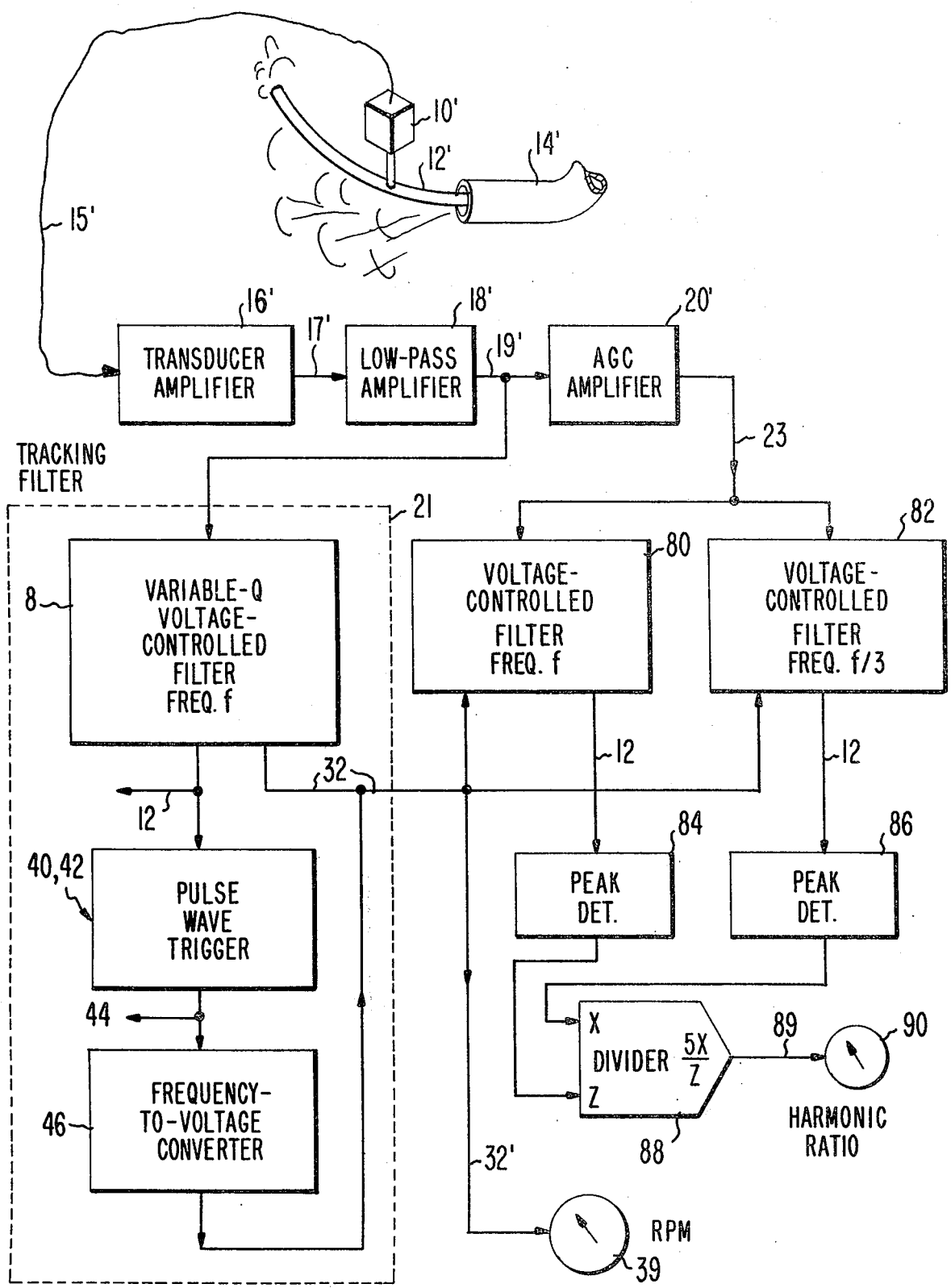
FIG. 1 is a block diagram of an engine diagnostic apparatus constructed according to the teachings of the invention.

Referring now in greater detail to the drawing, FIG. 1 shows the overall diagnostic apparatus starting with a pressure transducer 10' which may be a variable-reluctance pressure transducer Model DP15 manufactured by Validyne Engineering Corporation of Northridge, California 91324. The transducer responds to pressures ranging between −1 and +1 pounds per square inch. The transducer is mounted at the center of a metal tube 12' which is 20 inches long and ½ inch in inside diameter. The tube 12' is curved slightly, to allow the pressure transducer 10' to be located out of the exhaust stream when the tube is inserted about three inches into the open end of the exhaust pipe 14' of the engine (not shown).

According to the alternative mode of operation, the transducer tube 12' is inserted a short distance into the air intake of the engine. The system can operate on either the exhaust, the intake pressure, or the crankcase blow-by variations of an internal combustion engine.

The pressure transducer 10' is supplied with alternating-current excitation from a transducer amplifier 16 over a cable 15'. The electrical signal having an amplitude varying with pressure, which is produced by the transducer 10', is applied in the reverse direction over cable 15' to the amplifier 16'. The amplifier 16', which may be a Model CD12 transducer indicator manufactured by Validyne Engineering Corporation, together with transducer 10', responds to pressure variations having a frequency range from direct current to 1000 Hertz. The prominent fundamental speed-indicating frequency component in the exhaust of an engine ranges form 20 Hz at a low engine speed to 200 Hz at a high engine speed. The signal from transducer amplifier 16' in FIG. 1 is applied over line 17' to a low-pass amplifier 18', which may include two operational amplifiers constituted by a Motorola Corporation MC1558 integrated circuit unit. The output of low-pass amplifier 18' is applied over line 19 to the input of a automatic gain control (AGC) circuit 20', and to the input of a tracking filter 21 shown in greater detail in FIG. 2. The AGC circuit 20' may for example be a circuit as described in application Ser. No. 573,033 filed on Apr. 20, 1975, by E. M. Stuphin, Jr., for a "Fast Automatic Gain Control Circuit with Adjustable Range."

Figure 2:
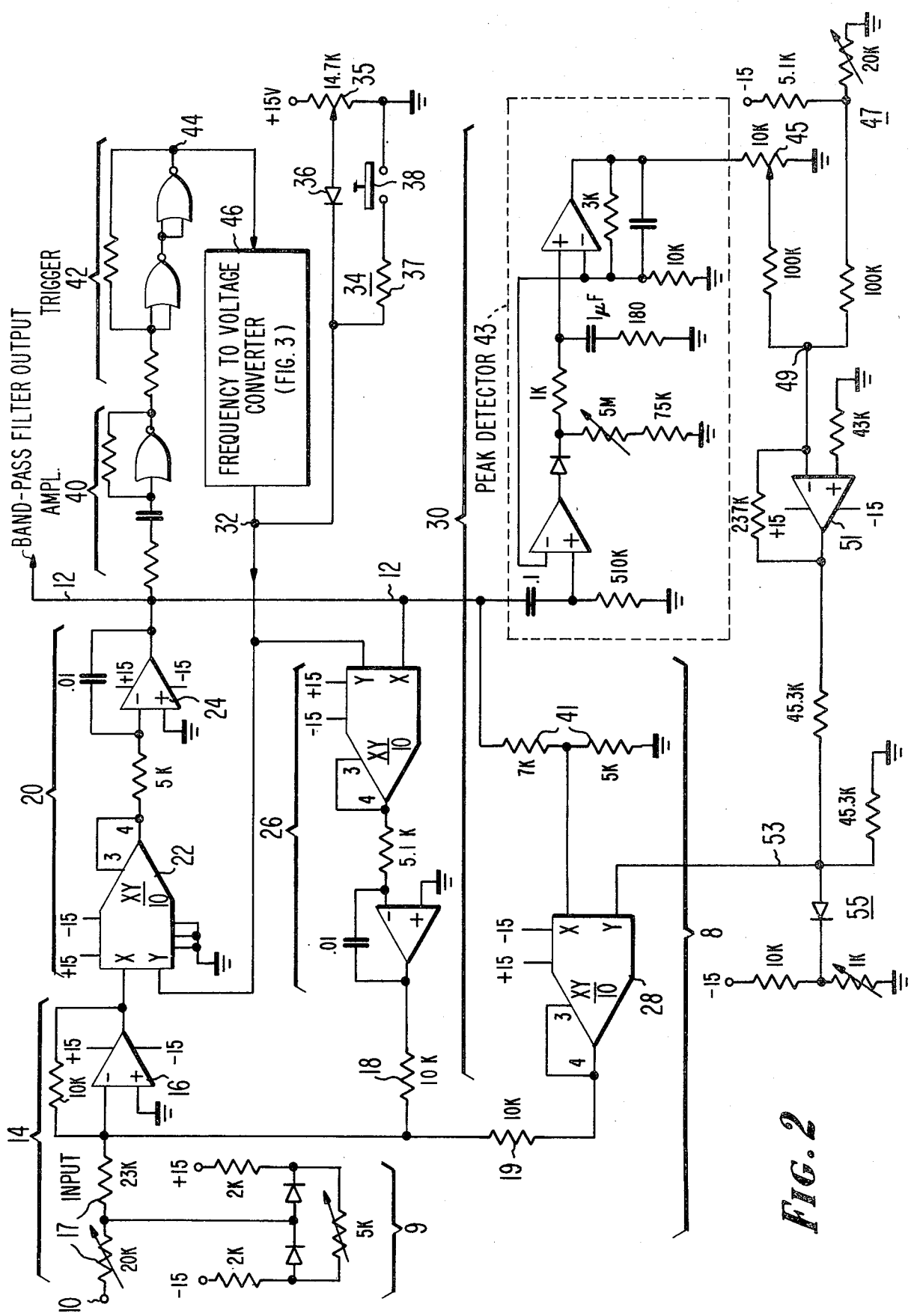
FIG. 2 is a circuit diagram of a tracking filter suitable for use in the apparatus of FIG. 1.

Reference is now made in greater detail to the tracking filter 21 of FIG. 1 and all of FIG. 2. This tracking filter is described and claimed in concurrently-filed application Ser. No. 646,389 by L. R. Hulls and S. C. Hadden on a "Filter Which Tracks Changing Frequency of Input Signal." The tracking filter includes a voltage-controlled filter 8 having a signal input terminal 10 and a signal output terminal 12. The input terminal 10 is connected through an input signal clamp and gain adjusting circuit 9 to a summation amplifier 14 consisting of an operational amplifier 16 connected as an inverting gain amplifier having summation input resistors 17, 18 and 19. Inverting gain amplifiers are described at page 172 of "Operational Amplifiers-Design and Applications" edited by Tobey, Graeme and Huelsman and published by McGraw-Hill in 1971. The operational amplifier 16, and other operational amplifiers in FIG. 1 may be constituted by one-half of a Motorola MC1458 operational amplifier unit.

The output of summation amplifier 14 is connected to an input X of a voltage-controlled integrator 20 including a multiplier 22, and an operational amplifier 24 connected as an integrator in a manner described at page 212 of the above-mentioned book. The multiplier 22 may be a Type AD532 manufactured by Analog Devices, and may be any multiplier described in pages 268–281 of the above-mentioned book. The output 12 of the integrator is connected in a positive feedback path consisting of a voltage-controlled integrator 26 like integrator 20 and in a parallel negative feedback path consisting of a multiplier 28 connected in a variable-Q feedback circuit 30.

The Y inputs of the multipliers in voltage-controlled integrators 20 and 26 are connected to a frequency control terminal 32 to which a control voltage is supplied to control the pass band center frequency of the voltage-controlled filter 8. The control voltage is initially provided by a circuit 34 at a low value to cause the filter to have a low frequency pass band and to provide initial lock. The circuit 34 provides a low voltage at 32 by current flowing from the +15v terminal through potentiometer 35, diode 36, resistor 37 and switch 38. If the frequency of the input signal applied to terminal 10 increases, a higher control voltage is supplied to terminal 32 by the action of a class A amplifier 40, a trigger circuit with hysteresis or limiting amplifier 42 producing a square wave at 44, and a frequency-to-voltage converter 46. The amplifier elements may be contained in RCA CD4001AE integrated circuit units.

The variable-Q feedback circuit 30 in FIG. 1 includes a feedback path from filter output line 12 through a voltage divider 41, the multiplier 28 and the summation resistor 19 to the input of summation amplifier 16. This feedback path determines the Q of the voltage-controlled filter 8. The Q remains constant so long as a constant voltage is applied to the Y input of multiplier 28. The Q of the filter is made to vary inversely with signal amplitude by a varying voltage applied to the Y input of multiplier 28.

A portion of the signal at the output 12 of the voltage-controlled filter 8 is applied to a peak detector 43, which may be constructed as shown using two operational amplifiers on a Motorola MC1458 integrated circuit unit. The peak detector 43 produces a d-c voltage across potentiometer 45 which varies in the same direction as the amplitude of the input signal at 10 and the output signal at 12 of the filter. A negative reference voltage from source 47 is summed with the varying positive voltage at potentiometer 45 at summing junction 49, and the sum is applied through an inverting amplifier 51 and over lead 53 as a negative voltage to the Y input of multiplier 28. A clamp circuit 55 prevents the negative d-c voltage on 53 from rising to 0 volts, which would tend to cause an infinite Q and undesired oscillations.

The a-c signal at the X input of multiplier 28 is multiplied by the negative d-c signal at the Y input of the multiplier, and the product at the output of the multiplier is 180° out of phase with the X input to the multiplier and the output 12 of the tracking filter. The amplitude of the inverted output from the multiplier 28 increases as the Y input to the multiplier becomes increasingly negative as the result of an increasingly high amplitude output from the tracking filter. To summarize, an increased signal amplitude at 12 from the tracking filter causes an increased amplitude signal with a 180° phase reversal from the multiplier 28, and this negative feedback to the summing amplifier 16 causes a reduction in the amplification of the input signal at 10, with the result that the Q of the filter is reduced. Increased signal amplitude causes reduced Q. Conversely, reduced signal amplitude causes increased Q.

The total transfer function of the tracking filter shown in FIG. 1 is:

$$H(S) = \frac{\frac{KVS}{10RCQ}}{S^2 + \frac{VS}{10RCQ} + \left(\frac{V}{10RC}\right)^2}$$

Figure 3:
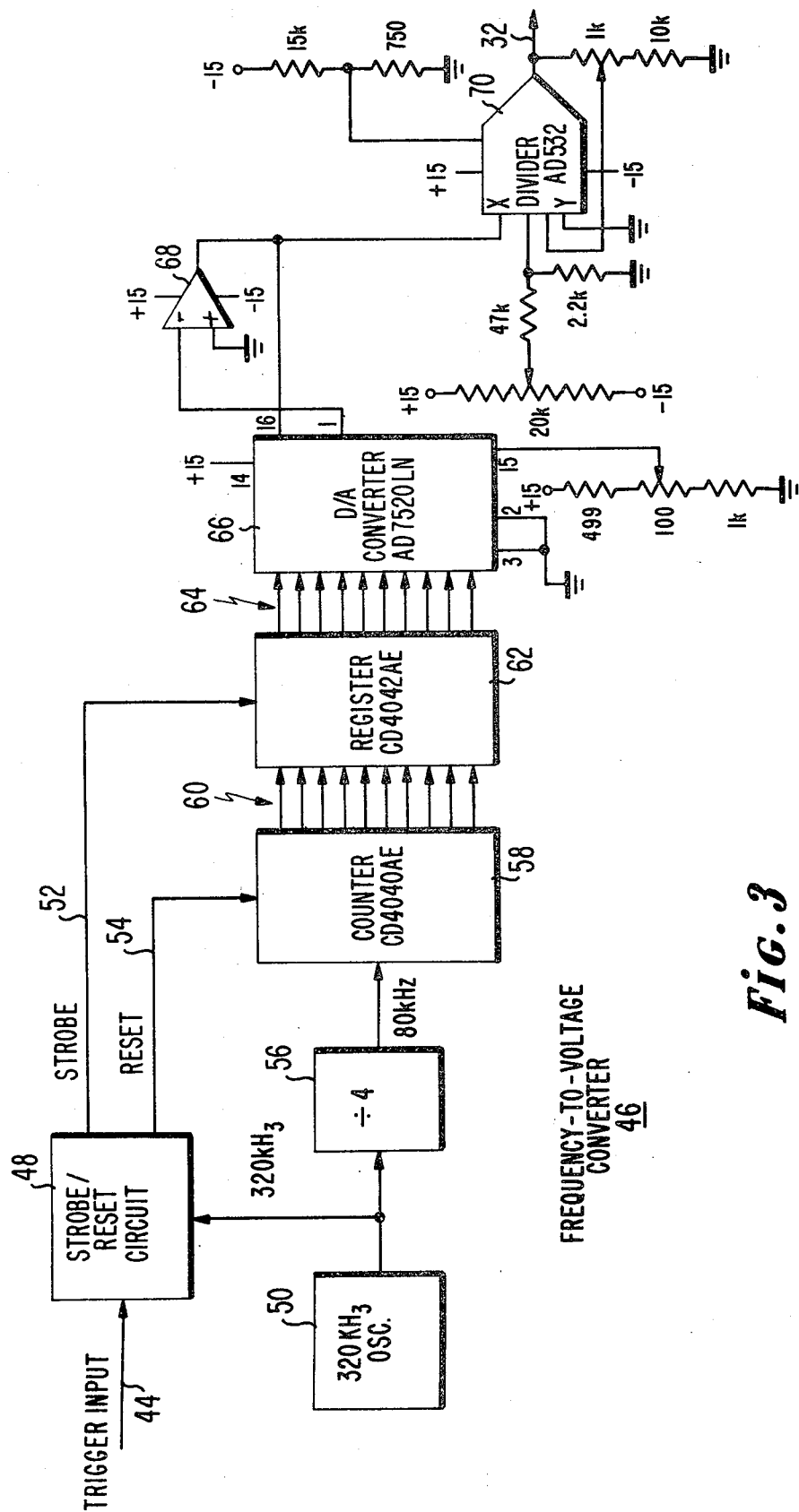
FIG. 3 is a circuit diagram of a frequency-to-voltage converter useful in the circuit of FIG. 2.

$S$ = LaPlace operator $Q = \frac{\text{Center frequency}}{\text{Bandwidth}}$ $K$ = Gain at center frequency $RC = \frac{1}{\text{Natural frequency}}$ $V$ = Control voltage The frequency-to-voltage converter 46 in FIG. 2 is shown in detail in FIG. 3. The input 44 of the converter is connected to a strobe/reset circuit 48 which also receives a 320 KHz square wave from an oscillator 50. The circuit 48 produces a strobe output pulse at 52, and shortly thereafter a reset output pulse at 54. The strobe and reset pulses occur once per cycle of the trigger input, which may have a repetition rate of a few hundred pulses or cycles per second. The strobe and reset pulses each have the duration of a half cycle of the square wave from the 320 KHz oscillator.

The frequency-to-voltage converter of FIG. 3 includes a divide-by-four circuit 56 which divides the 320 KHz square wave from oscillator 50 to an 80 KHz pulse wave which is applied to the input of a counter 58. The divider 56 may be constituted by an RCA CD4027AE unit.

The counter 58 counts the 80 KHz input pulses until is is reset by a reset pulse over line 54 from circuit 48. The counter, which may be an RCA CD4040AE integrated circuit unit, has 10 output lines 60 over which the count is transferred to a storage register 62 when the register is gated by a strobe pulse over line 52 from the circuit 48. The register 62 may consist of three RCA CD4042AE integrated circuits units. The register 62 has 10 output lines 64 connected to 10 inputs of a digital-to-analog converter 66 such as the Analog Devices AD7520LN integrated circuit unit. The analog output of the converter 66 is applied through an operational amplifier 68 to the X input of an analog divider 70 such as the Intronics Inc. D210 unit, or the Analog Devices AD532 unit where the reciprocal is taken. The output at 32 from the divider is a control voltage which varies linearly with the frequency or repetition rate of the trigger wave applied at 44 to the input of the frequency-to-voltage converter.

OPERATION OF FIG. 3

The trigger input at 44 is a pulse wave having a frequency equal to the center frequency passed by the voltage-controlled filter 8 of FIGS. 1 and 2. The time period between two successive pulses of the trigger pulse wave is measured by counting in counter 58 and storing in register 62. the number of cycles of the 80 KHz wave which occur between the two successive pulses. The stored digital count is translated in digital-to-analog converter 66 to a corresponding time-representing voltage having an amplitude in accordance with the period of the trigger pulse wave. the divider or inverter 70 translates the time-representing voltage to a corresponding frequency-representing voltage corresponding with the frequency of the input trigger wave. The frequency-representing voltage is obtained during a single period of the trigger wave, in contrast to prior art arrangements which require a sensing of a large number of periods of a wave in order to determine its frequency, or measuring less than each successive period. The frequency-representing voltage output at 32 changes without delay as the frequency of the trigger pulse wave changes.

OPERATION OF FIG. 2

The tracking filter in FIG. 2 includes a voltage-controlled filter 8 having a signal input terminal 10, a signal output terminal 12 and a frequency control terminal 32 to which a control voltage is applied to control the frequency pass band of the filter. A suitable minimum control voltage is applied to terminal 32 from initializing circuit 34 to make the frequency pass band of the filter encompass the frequency of a minimum-frequency input signal, being applied to input terminal 10, which it is desired to lock on to or track. This is accomplished by closing the switch 38 while the potentiometer 35 is at an appropriate setting. The frequency-to-voltage converter 46 is also adjusted to supply the same minimum control voltage to the terminal 32. When the switch 38 is opened, the control voltage applied to control terminal 32 is solely determined by the feedback loop including amplifier 40, trigger 42 and frequency-to-voltage converter 46.

If the frequency of the signal applied to input terminal 10, and passed to output terminal 12, increases slightly, the control voltage produced by amplifier 40, trigger 42 and converter 46 also increases slightly and causes the pass band frequency of the filter to increase a corresponding amount, without delay. Whenever the frequency of the input signal changes, the frequency pass band of the filter immediately changes to track the changing frequency of the input signal. The tracking filter is capable of responding very rapidly to a rapid change of input signal frequency because of the digital techniques employed in the frequency-to-voltage converter 46 to measure the period of each and every cycle of the signal from the filter and to then generate corresponding frequency-representing correction voltages for the voltage-controlled filter.

The variable Q feedback circuit 30 permits the tracking filter to lock in on, and track the frequency of, a low-amplitude input signal by causing the tracking filter to have a high Q which rejects distrubing nearby frequency components. The low amplitude signal and need for a high Q filter exist in an application of the invention to diagnostic equipment for internal combustion engines. The a-c signal frequency representing the rate of cylinder explosions in an engine during an initial idleing condition is of low amplitude in the presence of other nearby frequency components. The invention desireably causes the filter to have a high Q under these conditions.

When the engine is rapidly accelerated during an accelerator burst test, the a-c signal has a high amplitude, and the frequency of the a-c signal changes very rapidly. Under these conditions, the Q of the tracking filter should be low so that the filter can track the changing frequency. Otherwise the output frequency might get outside the pass band of the filter before the frequency-controlled feedback voltage changed the pass band frequency in a direction to include the new frequency. The invention desirably causes the filter to have a low Q under these conditions.

The diagnositic apparatus of FIG. 1 also includes a voltage-controlled filter 80 designed to pass the same prominent fundamental cylinder firing frequency $f$ as the variable-Q voltage-controlled filter 8. In addition, there is a voltage-controlled filter 82 designed to pass a subharmonic of the fundamental frequency, such as the third subharmonic $f/3$ of the fundamental frequency $f$. The voltage-controlled filters 80 and 82 are the same except in having frequency-determining components of different values appropriate to the respective frequencies $f$ and $f/3$. The voltage-controlled filters 80 and 82 receive the exhaust pressure-representing signal over line 23 from the automatic gain control amplifier 20; and receive the same frequency-controlling input voltage over lines 32 that is supplied to the variable-Q voltage-controlled filter 8. Therefore, filters 8 and 80 are made to track the changing fundamental frequency component $f$ as the engine speed changes, and the filter 82 is made to track the proportionally changing third subharmonic frequency component $f/3$ as the engine speed changes. The frequency-controlling voltage at 32 is also applied over line 32' to a voltometer 39 calibrated to indicate engine speed in RPM.

Figure 4:
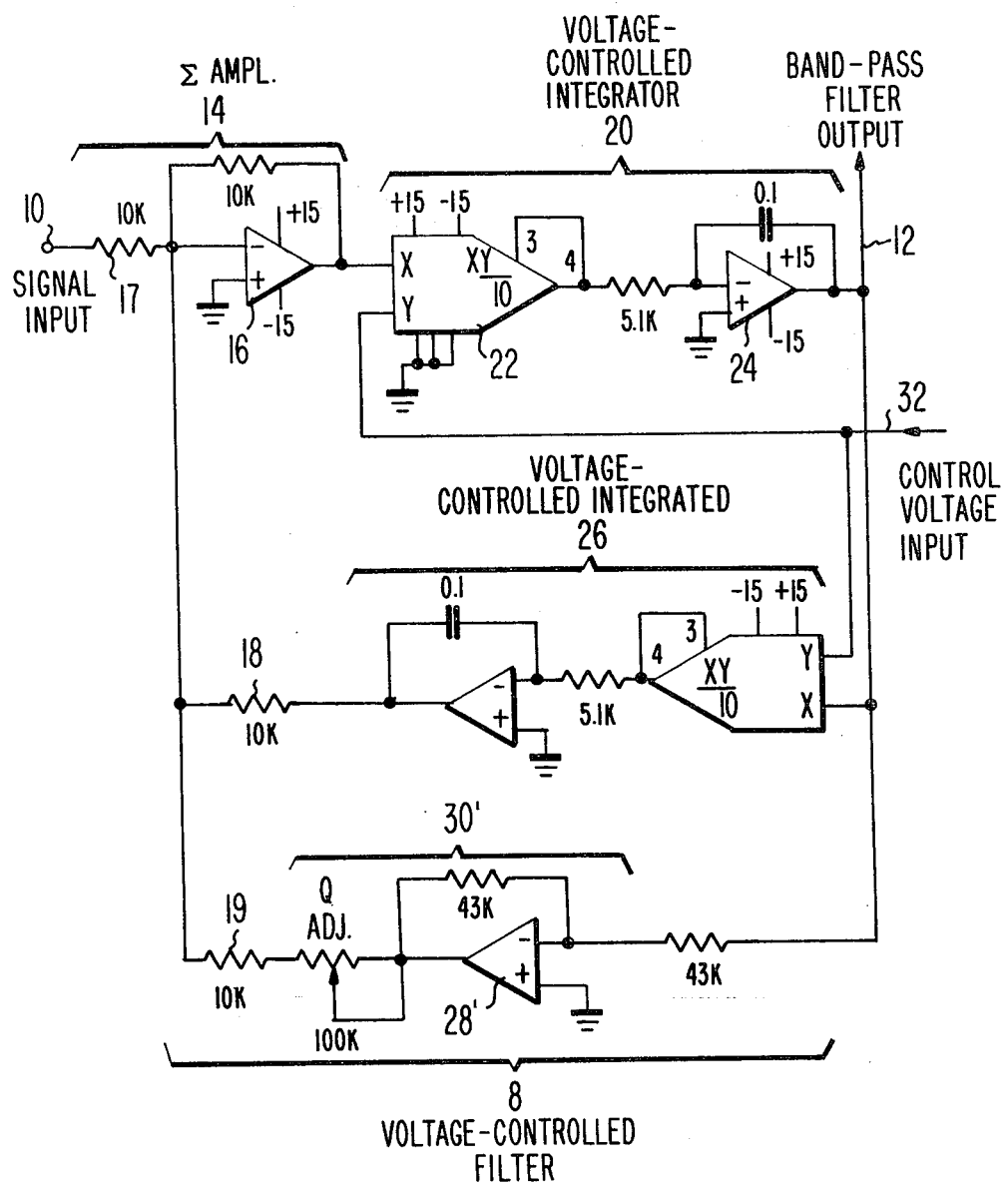
FIG. 4 is a circuit diagram of a voltage-controlled filter useful in the apparatus of FIG. 1.

Each voltage-controlled filter 80 and 82 may be constructed as shown in FIG. 4 to be the same as the variable-Q voltage-controlled 8 in FIG. 2 except that a constant-Q circuit 30' is included in place of the variable-Q circuit 30 in FIG. 1. Corresponding elements in FIGS. 2 and 4 are given the same reference numerals. The outputs at 12 from the filters 80 and 82 are applied to conventional peak detectors 84 and 86; respectively, which may be constructed in the manner of the peak detector 43 in FIG. 2. The output of peak detector 84 is coupled to the divisor input Z of an analog divider 88, and the output of peak detector 86 is coupled to the dividend input X of the divider 86. The output of the divider at 89 is coupled to a conventional voltometer 90 calibrated to indicate the ratio of the amplitude of the third subharmonic frequency component to the amplitude of the fundamental cylinder firing frequency component in the exhaust pressure waveform from the engine.

OPERATION OF THE DIAGNOSTIC APPARATUS OF FIG. 1

The pressure transducer 10' and the tube 12' may be mounted at the end of a hand-held stick, so that an operator can conveniently stand and poke the end of the tube 12' about 3 inches into the exhaust pipe 14' of an internal combustion engine (not shown) while the engine is operated at idle speed. The pressure pulsations produce a corresponding electrical wave which is amplified in transducer amplifier 16'. The low pass amplifier 18' and the AGC amplifier translate the signal to a wave of constant peak amplitude. The amplified wave at 19' is applied to the input of the variable-Q voltage-controlled filter 8 in the tracking filter 21. The filter has a narrow frequency pass band which passes a prominent cylinder firing frequency component that varies directly with engine speed, and which rejects or attenuates other disturbing frequency components. The pass band frequency of filter 8 is initially established by momentarily closing switch 38 in FIG. 2 while the engine is operated at idle speed. The output of 12 is, therefore, a relatively clean sine wave which is translated to a square wave in pulse wave trigger 40, 42. The frequency of the square wave at 44 is translated to a voltage in frequency-to-voltage converter 46 which is fed back over line 32 to the frequency control input of the variable-Q voltage-controlled filter 8 to make the filter lock onto and track a changing input signal frequency due to changes in engine speed.

The amplitude-controlled signal from AGC Amplifier 20' is applied over line 23 to the inputs of voltage-controlled filters 80 and 82. The filter 80 passes the prominent fundamental cylinder firing frequency component in the input signal, and the filter 82 passes the third subharmonic frequency component in the input signal. Both filters receive the same frequency-control voltage over line 32 that is developed in the tracking filter 21 and used to make the variable-Q voltage-controlled filter 8 track the input signal. Therefore, filter 80 tracks the fundamental frequency component and filter 82 tracks the third subharmonic frequency component.

The outputs of filters 80 and 82 are applied through peak detectors 84 and 86 to inputs of analog divider 88, from which a voltage representing the ratio of amplitudes of fundamental and third subharmonic frequency components is applied to a voltmeter 90 calibrated to indicate the ratio of the components.

The electrical signal from the exhaust pressure transducer 10' contains a cylinder firing fundamental frequency component which is especially strong relative to other frequency components when all cylinders of the engine are fully and equally operative. On the other hand, if one or more of the cylinders is partially of fully inoperative, the electrical signal contains a relatively high-amplitude subharmonic frequency component, and a relatively low-amplitude fundamental frequency component. The ratio of subharmonic frequency amplitude to fundamental frequency component increases.

The ratio may increase with seriousness of power loss in one cylinder as follows:

| Percentage Loss In One Cylinder | Subharmonic/Fundamental Ratio |
|---|---|
| 0 | 0 |
| 10 | 0.03 |
| 20 | 0.06 |
| 30 | 0.10 |
| 40 | 0.13 |
| 50 | 0.17 |
| 60 | 0.21 |
| 70 | 0.25 |
| 80 | 0.28 |
| 90 | 0.33 |
| 100 | 0.37 |

During a test of a particular six-cylinder diesel engine, the subharmonic/fundamental ratios at various engine speeds and various engine conditions were as follows:

| | Subharmonic/Fundamental Ratio | | |
|---|---|---|---|
| | Normal | Bypassed Injector | Minor Valve Leak |
| Low Idle | 0.1 | 1.4 | 1.4 |
| Full Speed | 0.4 | 2.0 | 0.6 |
| Deceleration | 0.2 | 0.2 | 0.6 |

The ratio for a normal engine is low under idle, full-speed and deceleration conditions. When one injector was bypassed disabling one cylinder, the ratio increased greatly at idle speed and at full speed. Because the injector fault has no effect when the fuel is shut off, the ratio is the same as the normal engine during deceleration of the engine. A minor valve fault has a substantial effect on the ratio during idle, but a minor effect during full speed operation. This is beause compression losses have less time to affect engine operation at high engine speeds. But, a minor valve fault causes a substantial increase in the ratio during deceleration of the engine.

From the foregoing it can be seen that the diagnostic apparatus of this invention provides a clear indication in the indicated subharmonic/fundamental ratio of a deficiency in power developed by one or more of the individual cylinders in the engine. This test can be accomplished in less than one minute without the need to make any electrical or physical connection to the engine. The disclosed apparatus may be a convenient and useful addition to apparatus for measuring the overall condition of an engine by the acceleration burst test.

What is claimed is:

1. An engine diagnostic apparatus, comprising:
   transducer means for translating a pressure waveform emitted by an engine to a corresponding complex electrical signal having a prominent fundamental frequency component which varies in frequency in direct proportion with engine speed, and having a subharmonic frequency component at a frequency which is a submultiple of said fundamental frequency,
   separator means to separate said subharmonic frequency, components and said fundamental frequency component from said complex electrical signal and from each other, and
   comparator means to compare the amplitude of said subharmonic frequency component with the amplitude of said fundamental frequency component to provide a measure of the unevenness of power strokes from individual cylinders of the engine.

2. Apparatus as defined in claim 1 wherein said comparator means includes a divider giving the ratio of subharmonic component amplitude to fundamental component amplitude.

3. Apparatus as defined in claim 1 wherein said separator means includes a tracking filter designed to pass and track said fundamental frequency component while it changes in frequency due to changes in engine speed, whereby to permit the comparison of the amplitudes of the subharmonic frequency component and the fundamental frequency at all speeds of the engine.

4. Apparatus as defined in claim 3 wherein said tracking filter includes a variable-Q voltage-controlled filter, and a frequency-to-voltage converter coupled from the output of the filter to the frequency control input terminal of the filter.

5. An apparatus as defined in claim 1 wherein said separator means includes a first voltage-controlled filter designed to pass said subharmonic frequency component, and a second voltage-controlled filter designed to pass said fundamental frequency component.

6. An apparatus as defined in claim 5 wherein said comparator means includes a divider, a first peak detector coupling the output of said first voltage-controlled filter to the divisor input of the divider, and a second peak detector coupling the output of said second voltage-controlled filter to the divident input of the divider.

7. Apparatus as defined in claim 6, and in addition a third voltage-controlled filter designed to pass said fundamental frequency component, and a frequency-to-voltage converter coupled from the output of said third voltage-controlled filter to the frequency control input terminals of said first, second and third voltage-controlled filters.

8. Apparatus as defined in claim 7 wherein said third voltage-controlled filter is a variable-Q filter.

* * * * *